R. F. BILLINGS.
SEEDER AND CULTIVATOR TEETH.
No. 175,649. Patented April 4, 1876.
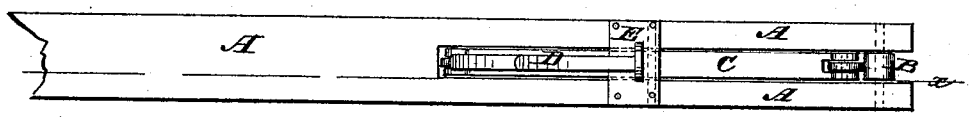
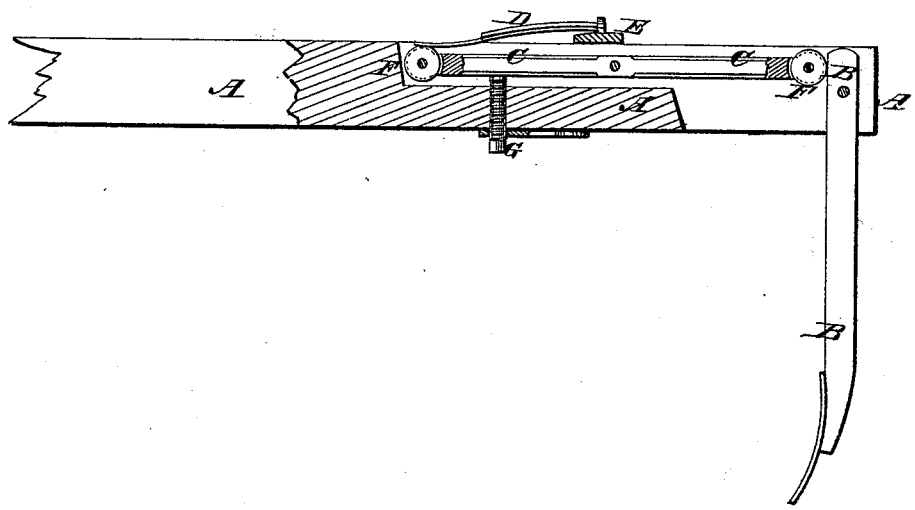
WITNESSES:
Francis McArdle
John Goethals
INVENTOR:
R. F. Billings
BY
ATTORNEYS.

UNITED STATES PATENT OFFICE.

RUFUS F. BILLINGS, OF KINGSTON, WISCONSIN.

IMPROVEMENT IN SEEDER AND CULTIVATOR TEETH.

Specification forming part of Letters Patent No. 175,649, dated April 4, 1876; application filed January 15, 1876.

*To all whom it may concern:*

Be it known that I, RUFUS F. BILLINGS, of Kingston, in the county of Green Lake and State of Wisconsin, have invented a new and useful Improvement in Seeder and Cultivator Tooth, of which the following is a specification:

Figure 1 is a top view of my improved tooth, shown as applied to a beam. Fig. 2 is a side view of the same, partly in section, through the line $x\ x$, Fig. 1.

Similar letters of reference indicate corresponding parts.

The object of this invention is to furnish an improved seeder and cultivator tooth, which shall be so constructed that it may swing back should it strike an obstruction, and may return to its place as soon as the obstruction has been passed, and which will allow the seeder or cultivator to be backed without raising the teeth from the ground.

The invention consists in the combination of the pivoted bar and the spring, with the pivoted tooth, and the slotted beam, and in the combination of the rollers with the ends of the pivoted bar, the spring, and the pivoted tooth.

A represents the beam, the rear part of which is slotted to receive the standard or shank of the tooth B, which is pivoted to said beam. C is a bar, which is placed in the slot of the beam A in a horizontal position, with its rear end resting against the forward side of the upper end of the tooth B a little above the pivot of said tooth. The bar C is pivoted at its middle part to the beam A, and upon the upper side of its forward end rests the forward end of a spring, D. The rear end of the spring D is attached to a plate, E, which is secured to the upper side of the beam A, over the middle part of the bar C.

With this construction, should the tooth B strike an obstruction, its upper end forces the rear end of the bar C downward, which raises its forward end against the spring D, the strength of which should be sufficient to hold the bar C and tooth B in place under ordinary circumstances, and to bring them back to their places as soon as the tooth B has passed the obstruction.

To the ends of the bar C are pivoted the rollers F, to rest against the tooth B and spring D and diminish the friction. G is a set-screw, which passes in through the lower side of the beam A, so that its forward end may rest against the lower side of the bar C, so that, by adjusting the screw G, the said bar C may be adjusted to yield to a greater or less pressure of the foot B, as may be desired, or as the character of the plowing may require.

Having thus described my invention, I claim as new and desire to secure by Letters Patent—

1. The lever C, pivoted at its center in the slot of beam A, and having its opposite ends engaged by the spring D and the standard B, as shown and described.

2. The combination of the pivoted bar C, the rollers F, the spring D, and the pivoted tooth B, substantially as herein shown and described.

RUFUS F. BILLINGS.

Witnesses:
ANS. P. BOARDMAN,
W. B. WOODWARD.